(12) United States Patent
Kim et al.

(10) Patent No.: US 7,318,647 B2
(45) Date of Patent: Jan. 15, 2008

(54) OPTICAL ENGINE APPARATUS

(75) Inventors: Sang-ik Kim, Suwon-si (KR); Jin-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 11/123,001

(22) Filed: May 6, 2005

(65) Prior Publication Data

US 2005/0254020 A1    Nov. 17, 2005

(30) Foreign Application Priority Data

May 12, 2004    (KR) .................... 10-2004-0033629

(51) Int. Cl.
G03B 21/28    (2006.01)
G03B 21/14    (2006.01)
G03B 21/22    (2006.01)
H04N 3/22    (2006.01)

(52) U.S. Cl. .................... 353/98; 353/119; 348/745

(58) Field of Classification Search ............ 353/74, 353/77, 78, 79, 98, 99, 20, 119, 69, 70; 348/744, 348/745; 362/551, 382, 466; 359/457, 460; 248/466
See application file for complete search history.

(56) References Cited

U.S. PATENT DOCUMENTS 6,719,432 B2 *    4/2004    Chen et al. .................... 353/74
6,773,115 B2 *    8/2004    Tseng et al. .................... 353/78
6,883,920 B2 *    4/2005    Chen .......................... 353/119
7,004,586 B2 *    2/2006    Morinaga ..................... 353/20
7,080,910 B2 *    7/2006    Engle .......................... 353/119
7,265,798 B2 *    9/2007    Kim ............................ 348/787

FOREIGN PATENT DOCUMENTS

| JP | 11-202409 | 7/1999 |
|---|---|---|
| KR | 20-0155567 | 6/1999 |
| KR | 10-0373934 | 2/2003 |
| KR | 2003-0035779 | 5/2003 |
| KR | 2003-0078216 | 8/2003 |
| KR | 2004-0003865 | 1/2004 |
| KR | 2004-33429 | 4/2004 |

OTHER PUBLICATIONS

Korean Office Action issued Nov. 28, 2005 in Korean Patent Application No. 2004-33629.

* cited by examiner

*Primary Examiner*—Melissa Jan Koval
(74) *Attorney, Agent, or Firm*—Stanzione & Kim, LLP

(57) ABSTRACT

An optical engine apparatus to magnify and project an image beam formed by a display device using light on a screen includes a light source to emit the light, a reflection mirror to reflect the light emitted from the light source toward the display device, and an adjuster coupled to the reflection mirror to adjust an inclined angle of the reflection mirror to move the light reflected from the reflection mirror toward the display device in a desired direction. In the optical engine apparatus, a position of light projected on a display device can be easily adjusted.

31 Claims, 6 Drawing Sheets

OPTICAL ENGINE APPARATUS

CROSS-REFERENCE TO RELATED APPLICATIONS

This application claims the benefit of Korean Patent Application No. 2004-33629, filed on May 12, 2004, in the Korean Intellectual Property Office, the disclosure of which is incorporated herein in its entirety and by reference.

BACKGROUND OF THE INVENTION

1. Field of the Invention

The present general inventive concept relates to an optical engine apparatus, and more particularly, to an optical engine apparatus, in which a position of light projected on a display device can be easily adjusted.

2. Description of the Related Art

An optical engine apparatus projects light emitted from a light source toward a display device, such as a liquid crystal display (LCD) or a digital micro-mirror display (DMD), so as to form an image beam, and displays a picture on a screen by magnifying and projecting the image beam onto the screen.

As an example of the optical engine apparatus, a conventional optical engine assembly is disclosed in Korean Patent First Publication No. 2003-78216. The conventional optical engine assembly comprises a light source emitting light, a color wheel transmitting the light emitted from the light source therethrough selectively according to wavelengths of the light, a uniform light generator controlling the light transmitted through the color wheel to be uniform, an optical path transformation unit transforming a path of the light traveling via the uniform light generator toward a DMD panel, a prism reflecting the light traveling via the optical path transformation unit toward the DMD panel, the DMD panel forming an image beam, and a projecting system magnifying and projecting the image beam formed by the DMD panel onto a screen.

Here, the optical path transformation unit comprises a reflection mirror to reflect the light traveling via the uniform light generator, a first lens to focus the light, another reflection mirror to transform the path of the light traveling via the first lens toward the prism, and a second lens to focus the light into the prism.

Meanwhile, when the foregoing configurations are assembled into the conventional optical engine assembly, a position of the light passing through the uniform light generator should be adjusted so as to project the light on the DMD panel. At this time, if an optical adjusting unit is additionally provided to adjust an inclined angle of the reflection mirror, a user can easily adjust the position of the light passing through the uniform light generator to be projected on the DMD panel by adjusting the inclined angle of the reflection mirror through the optical adjusting unit.

SUMMARY OF THE INVENTION

In order to solve the foregoing and/or other problems, it is an aspect of the present general inventive concept to provide an optical engine apparatus, in which a position of light projected on a display device can be easily adjusted.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing an optical engine apparatus magnifying and projecting light an image beam formed by a display device on a screen, the optical engine apparatus comprising a light source to emit light, a reflection mirror to reflect the light emitted from the light source toward the display device, and an adjuster coupled to the reflection mirror to adjust an inclined angle of the reflection mirror to move the light reflected from the reflection mirror toward the display device in a desired direction.

According to an aspect of the present general inventive concept, the adjuster adjusts the inclined angle of the reflection mirror to move the light projected from the display device onto the screen in at least one direction among up and down directions, a diagonal direction, and right and left directions.

According to another aspect of the present general inventive concept, the adjuster comprises a first adjuster to adjust the inclined angle of the reflection mirror to move the light projected from the display device onto the screen in the up and down directions, a second adjuster to adjust the inclined angle of the reflection mirror to move the light projected from the display device onto the screen in the diagonal direction, and a third adjuster to adjust the inclined angle of the reflection mirror to move the light projected from the display device onto the screen in the right and left directions.

According to yet another aspect of the present general inventive concept, the optical engine apparatus further comprises a light tunnel provided on an optical path between the light source and the reflection mirror to uniformize the light traveling from the light source toward the reflection mirror, and the adjuster adjusts the inclined angle of the reflection mirror that reflects the light traveling via the light tunnel toward the display device to make the uniformized light correspond to the display device.

According to still another aspect of the present general inventive concept, the optical engine apparatus further comprises a relay lens provided in the optical path between the light tunnel and the display device to focus the light from the light tunnel. The reflection mirror comprises a first reflection mirror to reflect the light traveling via the light tunnel toward the relay lens, and a second reflection mirror to reflect the light passing through the relay lens toward the display device, and the adjuster is coupled to at least one of the first reflection mirror and the second reflection mirror.

According to another aspect of the present general inventive concept, the first reflection mirror has a first side supported by a first reflection mirror holder at a circumference thereof, and a second side covered with a first reflection mirror cover.

According to another aspect of the present general inventive concept, the adjuster comprises an insertion hole formed in the first reflection mirror cover, a fastening hole formed in the first reflection mirror holder, and an adjusting member coupled to the first reflection mirror holder through the fastening hole and the insertion hole to adjust an inclined angle of the first reflection mirror.

According to another aspect of the present general inventive concept, the insertion hole and the fastening hole are formed with female threads therein, respectively, and the adjusting member comprises a screw portion mating with the female threads, and a knob to rotate the screw portion in fastening and releasing directions.

According to another aspect of the present general inventive concept, the adjusting member is coupled with a spring to minimize loosening of the adjuster while being rotated in the fastening and releasing directions.

According to another embodiment of the present general inventive concept, the optical engine apparatus further comprises a sealing member coupled to a circumference of the first reflection mirror cover to protect the reflection mirror accommodated in the first reflection mirror cover from foreign materials.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
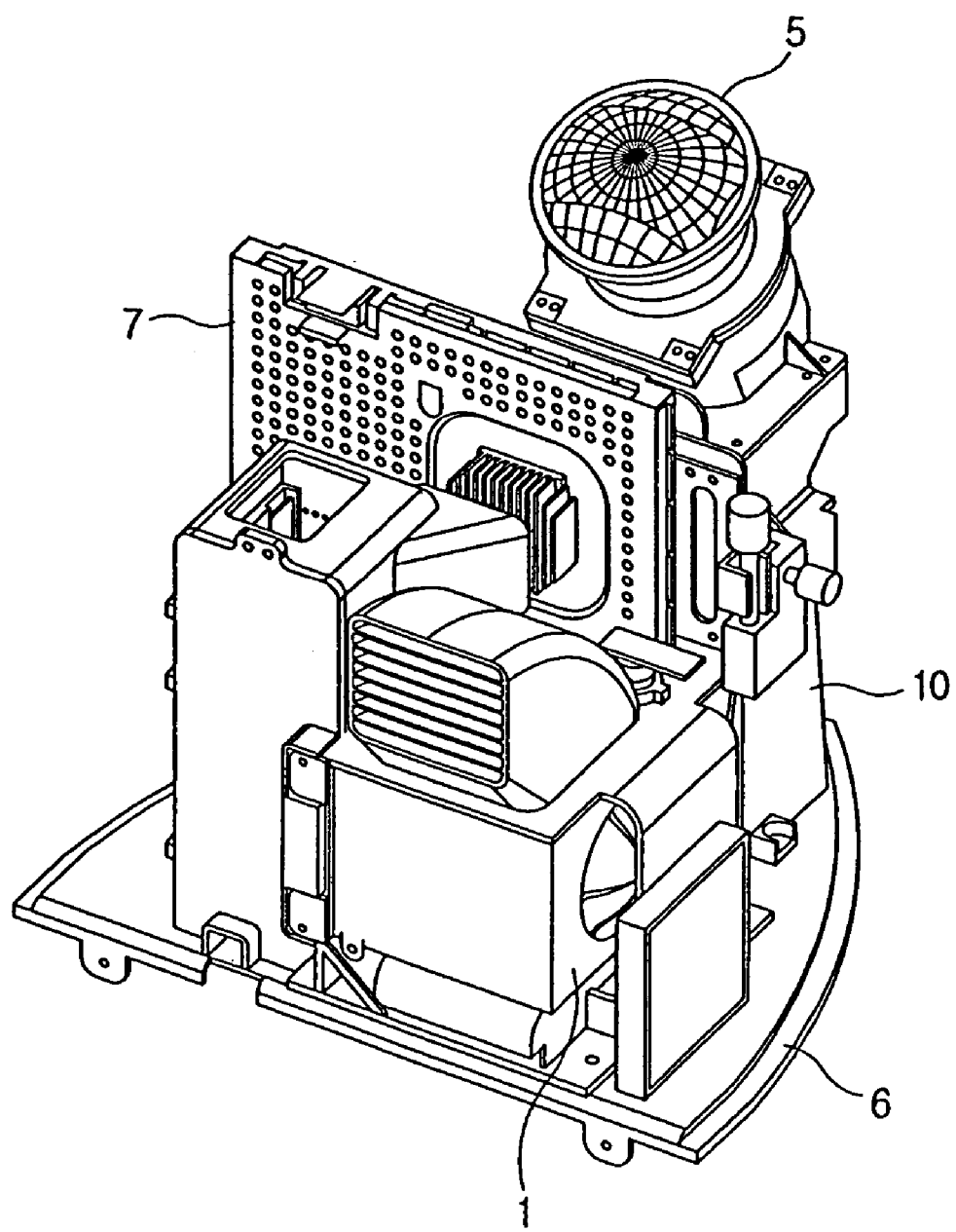
FIG. 1 is a perspective view illustrating an optical engine apparatus according to an embodiment of the present general inventive concept.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
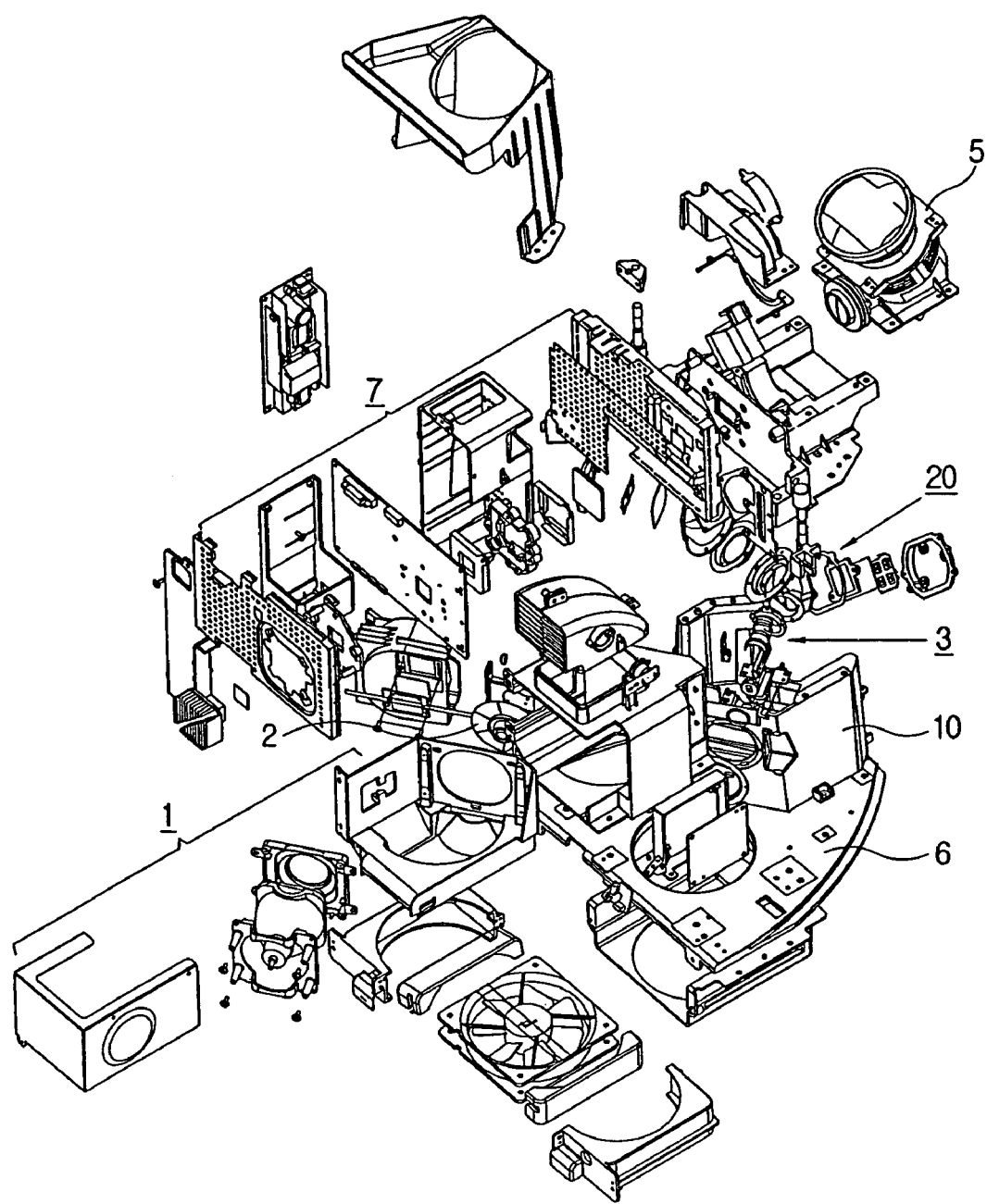
FIG. 2 is an exploded perspective view illustrating the optical engine apparatus of FIG. 1.

As shown in FIGS. 1 and 2, an optical engine apparatus according to an embodiment of the present general inventive concept may comprise a light source 1 to emit light, a digital micro-mirror display (DMD) panel 7 used as a display device on which the light emitted from the light source 1 is projected to form an image beam, and a projector 5 to magnify and project the image beam formed by the DMD panel 7 onto a screen of a projection television.

The optical engine apparatus may further comprise a color wheel assembly 2 comprising a color wheel to divide the light emitted from the light source 1 into red (R), green (G) and blue (B) beams, a light tunnel assembly 3 having a light tunnel used as a uniform light generator to make the light beam passing through the color wheel assembly 2 have a planar form like a surface of the DMD panel 7, and an optical path transformation assembly 20 to transform a path of the light traveling via the light tunnel assembly 3 toward the DMD panel 7.

Here, the light source 1 can be seated on a base 6, and an optical unit accommodation casing 10 can be placed behind the light source 1 and coupled to the base 6. The optical unit accommodation casing 10 can be partitioned by a partition 13 (refer to FIG. 3) into a first accommodating portion 11 to which the color wheel assembly 2 is mounted, and a second accommodating portion 12 to which the optical path transformation assembly 20 is mounted.

Figure 3:
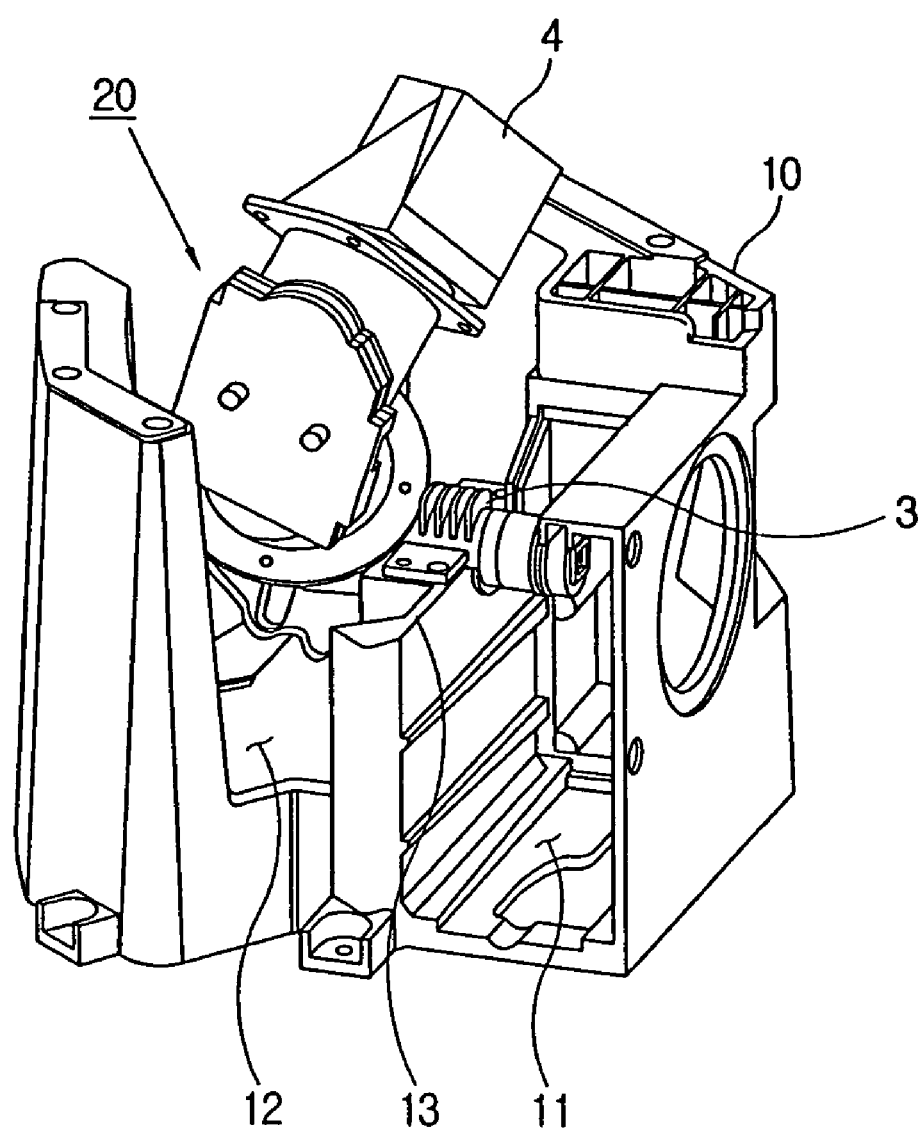
FIG. 3 is a perspective view illustrating an optical path transformation assembly mounted into an optical unit accommodation casing.

As shown in FIG. 3, the optical path transformation assembly 20 can have a first side coupled with a prism 4, and a second side accommodated in the second accommodating portion 12 and connected to the light tunnel assembly 3 mounted to the partition 13.

The optical path transformation assembly 20 can be provided on an optical path between the light tunnel assembly 3 and the prism 4, and can transform the path of the light passing through the light tunnel assembly 3 toward the prism 4, so that the light travels toward the DMD panel 7 by the prism 4.

The optical path transformation assembly 20 can comprise optical path transformers 30, 36, and 37 to transform the path of the light passing through the light tunnel assembly 3 toward the DMD panel 7 by the prism 4, and accommodating units 41 and 42 to accommodate the optical path transformers 30, 36, and 37 and to form the optical path with the optical path transformers 30, 36, and 37.

The optical path transformers 30, 36, and 37 can be referred to as a first reflection mirror assembly 30 to reflect the light emitted from the light source 1 and passing through the color wheel assembly 2 and the light tunnel assembly 3, a relay lens 36 to focus the light passing through the light tunnel assembly 3 and reflected from the first reflection mirror 31 to thereby enhance brightness, and a second reflection mirror assembly 37 to reflect the light passing through the relay lens 36 toward the prism 4, respectively.

The first reflection mirror assembly 30 may comprise a first reflection mirror 31 to reflect the light passing through the light tunnel assembly 3 toward the relay lens 36, a first reflection mirror cover 33 to cover a back of the first reflection mirror 31, a supporting bracket 34 (FIG. 6) provided between the first reflection mirror cover 33 and the first reflection mirror 31 to support the back of the first reflection mirror 31, a first reflection mirror holder 32 coupled to a front of the first reflection mirror 31 to hold the first reflection mirror 31 within the first reflection mirror cover 33. Here, the first reflection mirror holder 32 can have a through hole in a center thereof and can surround edges (outer circumferences) of the first reflection mirror 31. Further, the first reflection mirror cover 33 can be coupled to a second coupling flange 55 through a sealing member 35 disposed therebetween to protect the first reflection mirror 31 from contamination due to foreign materials.

The second reflection mirror assembly 37 may comprise a second reflection mirror 38 to reflect the light passing through the relay lens 36 toward the prism 4, and a second reflection mirror cover 39 to cover a back of the second reflection mirror 38. Here, the prism 4 can reflect the light reflected from the second reflection mirror 38 toward the DMD panel 7, and can transmit and project the light reflected from the DMD panel 7 toward a projecting lens of the projector 5.

The accommodating units 41 and 42 can have a shape of a hollow pipe to accommodate the optical path transformers 30, 36, and 37, that is, the first reflection mirror assembly 30, the relay lens 36 and the second mirror assembly 37, and to form the optical path based on the optical path transformers 30, 36, and 37. Further, the accommodating units 41 and 42 can be respectively formed with an incoming hole 51 through which the light passing through the light tunnel assembly 3 enters the optical path transformation assembly 20, and an outgoing hole 68 through which the light traveling via the optical path transformers 30, 36, and 37 exits toward the DMD panel 7.

The accommodating units 41 and 42 may comprise a first accommodating unit 41 and a second accommodating unit 42, which are coupled to each other and form the optical path of the optical path transformers 30, 36, and 37. The first accommodating unit 41 can be coupled with the light tunnel assembly 3, the first reflection mirror assembly 30 and the relay lens 36. The second accommodating unit 42 can be coupled with the second reflection mirror assembly 37 and the prism 4.

The first accommodating unit 41 may comprise the incoming hole 51 to communicate with the light tunnel assembly 3 to allow the light traveling via the light tunnel assembly 3 to enter an inside of the first accommodating unit 41, a first coupling flange 50 extended along circumference of the incoming hole 51, a first through hole 54 to communicate with the first reflection mirror assembly 30 inclined with respect to the incident light entering through the incoming hole 51, the second coupling flange 55 extended along a circumference of the first through hole 54, a mounting hole 56 to receive the relay lens 36, and a third coupling flange 57 extended along a circumference of the mounting hole 56.

The second accommodating unit 42 may comprise a passing hole 63 to allow the light passing through the relay lens 36 to enter an inside of the second accommodating unit 42, a fourth coupling flange 62 extended along a circumference of the passing hole 63 and coupled with the third coupling flange 57, a second through hole 66 to communicate with the second reflection mirror assembly 37 to receive the light passing through the passing hole 63, a fifth coupling flange 67 extended along a circumference of the second through hole 66, the outgoing hole 68 through which the light goes out from the second accommodating unit 42 so as to allow the light reflected from the second reflection mirror 38 to travel toward the prism 4, and a sixth coupling flange 69 extended along a circumference of the outgoing hole 68, coupled with the prism 4, and formed with a fourth coupling hole 70 through which the prism 4 communicates with the second reflection mirror 38.

Figure 4:
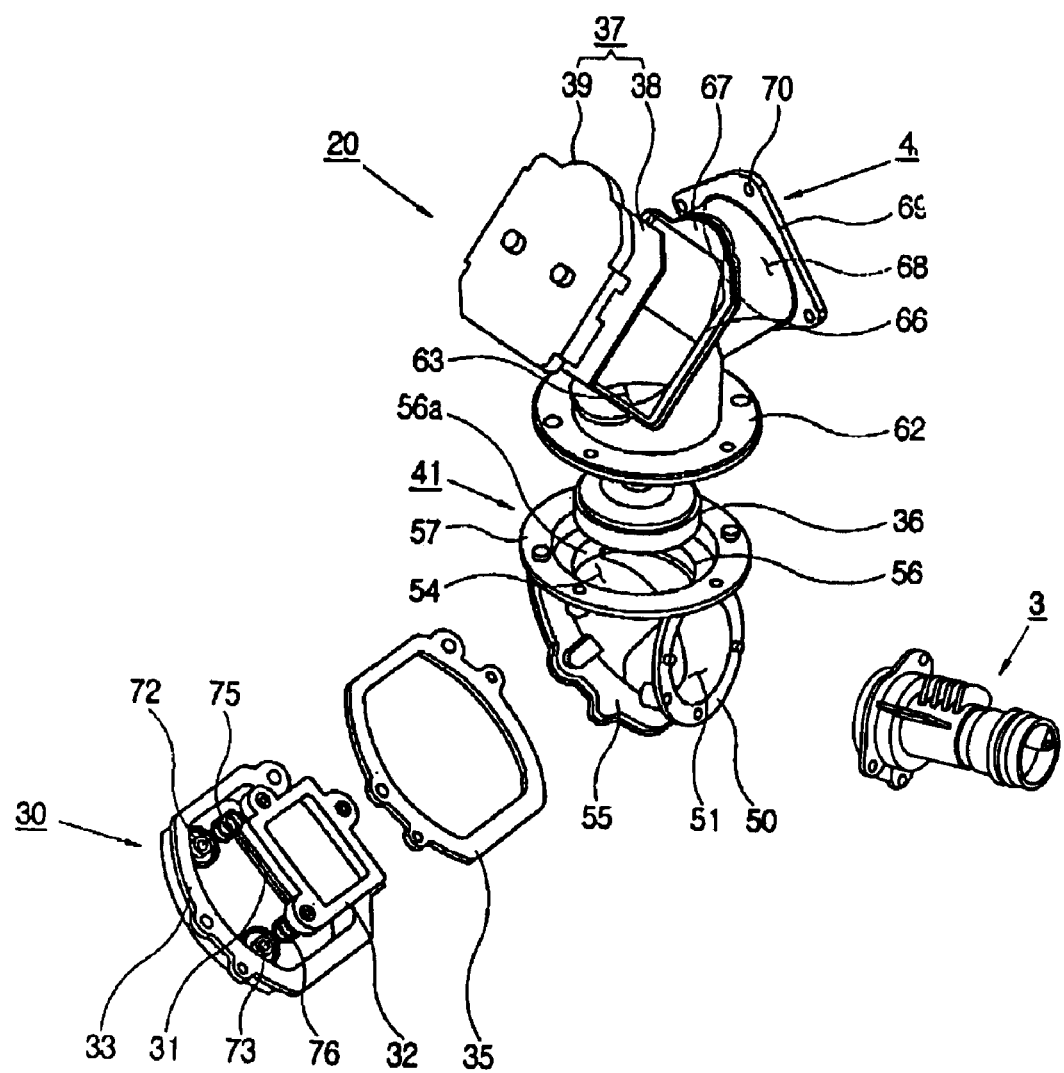
FIG. 4 is an exploded perspective view illustrating the optical path transformation assembly of FIG. 3.

The relay lens 36 can be disposed in the first and second accommodating units 41 and 42 to be supported by inside walls of the first and second accommodating units 41 and 42 defining the mounting hole 56 and the passing hole 63, respectively, when the first and second accommodating units 41 and 42 are assembled. Referring to FIG. 4, the relay lens 36 is accommodated in the mounting hole 56 and supported by an inside wall 56a of the mounting hole 56.

Meanwhile, the first reflection mirror assembly 30 can comprise an optical adjusting unit to adjust an inclined angle of the first reflection mirror 31, thereby adjusting a projecting position of the light passing through the light tunnel assembly 3 reflected from the first reflection mirror 31, and projected on the DMD panel 7.

Supposing that a user looks at a front of the screen, the optical adjusting unit may comprise a first adjuster to adjust the light projected from the DMD panel 7 to move in up and down directions of the screen, a second adjuster to adjust the light projected from the DMD panel 7 to move in a diagonal direction of the screen, and a third adjuster to adjust the light projected from the DMD panel 7 to move in left and right directions of the screen.

Figure 5:
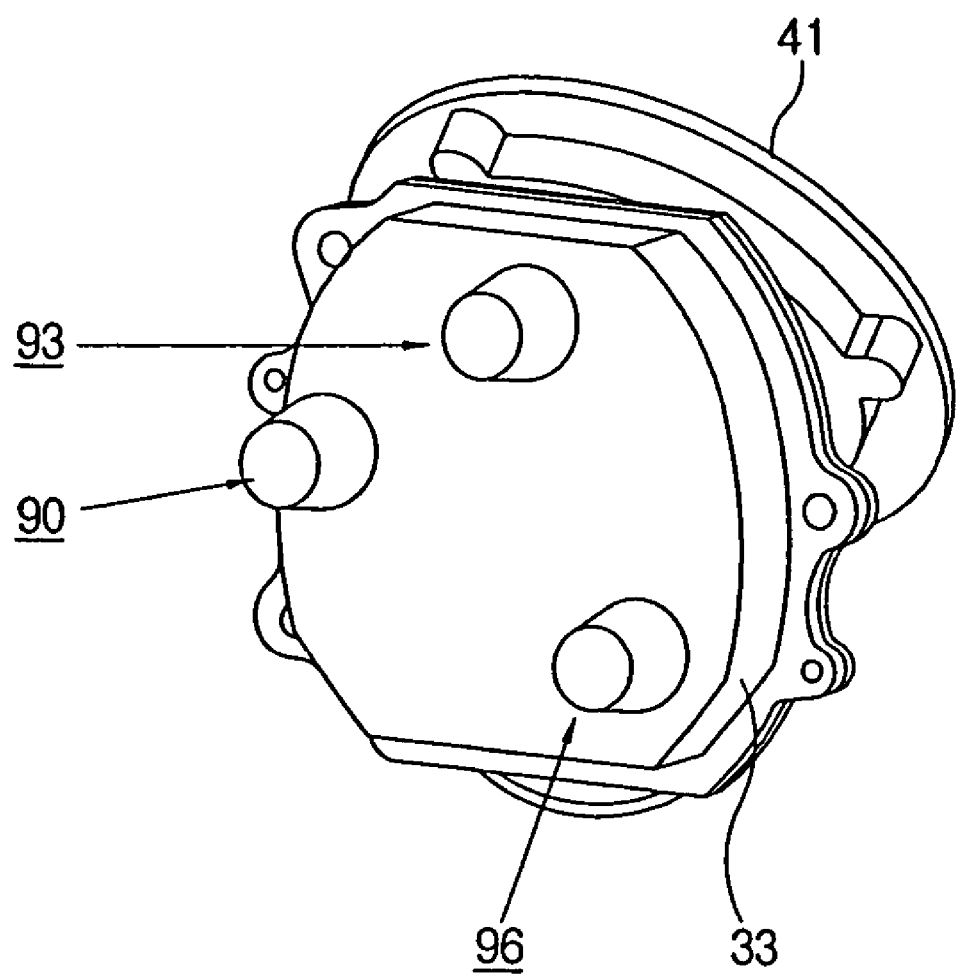
FIG. 5 is a rear perspective view illustrating a first reflection mirror assembly of FIG. 4.
Figure 6:
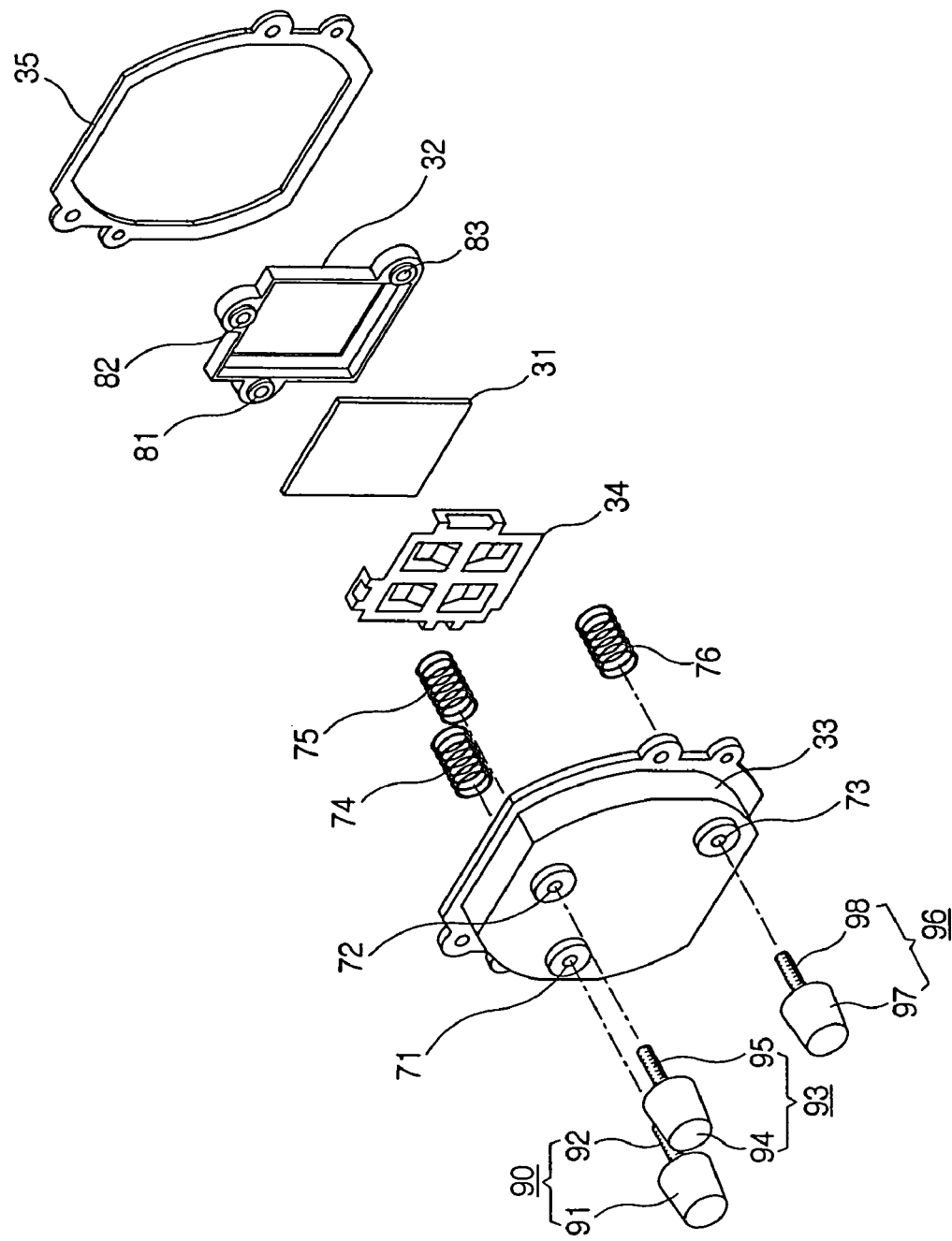
FIG. 6 is an exploded perspective view illustrating the first reflection mirror assembly of FIG. 5 and an optical adjusting unit.

Referring to FIGS. 4 through 6, the first adjuster may comprise a first insertion hole 71 formed in the first reflection mirror cover 33 and formed with a female threaded thereinside, a first fastening hole 81 formed in the first reflection mirror holder 32 at a position aligned with the first insertion hole 71, and formed with a female threaded therein, and a first adjusting member 90 coupled to the first reflection mirror cover 33 and the third reflection mirror holder 32 through the first insertion hole 71 and the first fastening hole 81, respectively, to adjust the inclined angle of the first reflection mirror 31 according to a rotational direction of the first adjusting member 90.

The first adjusting member 90 can comprise a first screw 92 formed with a male thread mating with the female thread of the first insertion hole 71 and inserted in the first fastening hole 81 through the first insertion hole 71, and a first knob 91 placed opposite to the first screw 92 and allowing a user to grab and rotate it in fastening and releasing directions. Further, a first spring 74 can be coupled with the first screw 92 so as to minimize rattling while the first adjusting member 90 is rotated in the fastening and releasing directions.

Therefore, when the user grabs and rotates the first knob 92 in the fastening direction, the male thread of the first screw 92 can mate with the female threads of the first insertion hole 71 and the first fastening hole 81, so that the first screw 92 of the first adjusting member 90 moves forward to push the first reflection mirror 31 backward with respect to the second and third adjusters. Thus, the first reflection mirror 31 can be inclined to be disposed in a downward inclined position. Consequently, when the light passing through the light tunnel assembly 3 is reflected from the first reflection mirror 31 disposed in the downward inclined position, the image beam can move downward on the screen. That is, the projecting position of the light can be moved to a lower area of the screen by moving the first reflection mirror 31 to the downward inclined position. On the other hand, when the first knob 91 is excessively rotated in the fastening direction, the light may not be projected to an upper area of the screen.

Oppositely, when the user grabs and rotates the first knob 92 in the releasing direction opposite to the fastening direction, the male thread of the first screw 92 can mate with the female threads of the first insertion hole 71 and the first fastening hole 81, so that the first screw 92 of the first adjusting member 90 moves backward and controls the first reflection mirror 31 to move forward with respect to the second and third adjusters. Thus, the first reflection mirror 31 can be inclined to be disposed in an upward inclined position. Consequently, when the light passing through the light tunnel assembly 3 is reflected from the first reflection mirror 31 disposed in the upward inclined position, the image beam can move upward on the screen. That is, the projecting position of the light can be moved to the upper area of the screen by moving the first reflection mirror 31 of the upward inclined position. On the other hand, when the first knob 91 is excessively rotated in the releasing direction, the light is not projected to a lower area of the screen.

The second adjuster can comprise a second insertion hole 72 formed in the first reflection mirror cover 33 and formed with a female threaded thereinside, a second fastening hole 82 formed in the first reflection mirror holder 32 at a position aligned with the second insertion hole 72, and formed with a female threaded therein, and a second adjusting member 93 coupled to the first reflection mirror 33 and the first reflection mirror holder 32 through the second insertion hole 72 and the second fastening hole 82, respectively, to adjust the inclined angle of the first reflection mirror 31 according to a rotational direction of the second adjusting member 93.

The second adjusting member 93 may comprise a second screw 95 formed with a male thread mating with the female thread of the second insertion hole 72 and inserted in the second fastening hole 82 through the second insertion hole 72, and a second knob 94 placed opposite to the second screw 95 and allowing a user to grab and rotate it in fastening and releasing directions. Further, a second spring 75 can be coupled with the second screw 92 so as to minimize rattling while the second adjusting member 90 is rotated in the fastening and releasing directions.

Therefore, when the user grabs and rotates the second knob 94 in the fastening direction, the male thread of the second screw 95 can mate with the female threads of the second insertion hole 72 and the second fastening hole 82, so that the second screw 95 of the second adjusting member 90 moves forward to push the first reflection mirror 31 backward with respect to the first and third adjusters. Thus, the first reflection mirror 31 can be inclined to be disposed in a first diagonally inclined position. Consequently, when the light passing through the light tunnel assembly 3 is reflected from the first reflection mirror 31 disposed in the first diagonally inclined position, the image beam can move to an upper left area of the screen. That is, the projecting position of the light can be moved to the upper left area of the screen by moving the first reflection mirror 31 to the first diagonally inclined position. On the other hand, when the second knob 94 is excessively rotated in the fastening direction, the light is not projected to a lower right area of the screen.

Oppositely, when the user grabs and rotates the second knob 94 in the releasing direction opposite to the fastening direction, the male thread of the first screw 95 can mated with the female threads of the second insertion hole 72 and the second fastening hole 82, so that the second screw 95 of the second adjusting member 90 can move backward to control the first reflection mirror 31 to move forward with respect to the first and third adjusters. Thus, the first reflection mirror 31 can be inclined to be disposed in a second diagonally inclined position. Consequently, when the light passing through the light tunnel assembly 3 is reflected from the first reflection mirror 31 disposed in the second diagonally inclined position, the image beam can move to a lower right area on the screen. That is, the projecting position of the light can be moved to the lower right area of the screen by moving the first reflection mirror 31 to the second diagonally inclined position. On the other hand, when the second knob 94 is excessively rotated in the releasing direction, the light is not projected to the upper left area of the screen.

The third adjuster may comprise a third insertion hole 73 formed in the first reflection mirror cover 33 and formed with a female threaded thereinside, a third fastening hole 83 formed in the first reflection mirror holder 32 at a position aligned with the third insertion hole 73, and formed with a female threaded therein, and a third adjusting member 96 coupled to the first reflection mirror cover 33 and the first reflection mirror holder 32 through the third insertion hole 73 and the third fastening hole 83, respectively, to adjust the inclined angle of the first reflection mirror 31 according to a rotational direction of the third adjusting member 96.

The third adjusting member 96 may comprise a third screw 98 formed with a male thread mating with the female thread of the third insertion hole 73 and inserted in the third fastening hole 83 through the third insertion hole 73, and a third knob 97 placed opposite to the third screw 98 to allow the user to grab and rotate it in the fastening and releasing directions. Further, a third spring 76 can be coupled with the third screw 98 so as to minimize rattling while the third adjusting member 96 is rotated in the fastening and releasing directions.

Therefore, when the user grabs and rotates the first knob 92 in the fastening direction, the male thread of the third screw 98 can mate with the female threads of the third insertion hole 73 and the third fastening hole 83, so that the third screw 98 of the third adjusting member 96 moves forward to push the first reflection mirror 31 backward with respect to the first and second adjusters. Thus, the first reflection mirror 31 can be inclined to be disposed in a rightward inclined position. Consequently, when the light passing through the light tunnel assembly 3 can be reflected from the first reflection mirror 31 disposed in the rightward inclined position, the image beam moves rightward on the screen. That is, the projecting position of the light can be moved to a right area of the screen by moving the first reflection mirror 31 to the rightward inclined position. On the other hand, when the third knob 97 is excessively rotated in the fastening direction, the light is not projected to a left area of the screen.

When the user grabs and rotates the third knob 97 in the releasing direction, the male thread of the third screw 98 can mate with the female threads of the third insertion hole 73 and the third fastening hole 83, so that the third screw 98 of the third adjusting member 96 moves backward and controls the first reflection mirror 31 forward with respect to the first and second adjusters. Thus, the first reflection mirror 31 can be inclined to be disposed in a leftward inclined position. Consequently, when the light passing through the light tunnel assembly 3 is reflected from the first reflection mirror 31 disposed in the leftward inclined position, the image beam moves leftward on the screen. That is, the projecting position of the light can be moved to a left area of the screen by moving the first reflection mirror 31 to the leftward inclined position. On the other hand, when the third knob 97 is excessively rotated in the releasing direction, the light is not projected to a right area of the screen.

An assembling process of the optical engine apparatus with the above configuration will be described hereinbelow.

First, the first coupling flange 50 of the first accommodating unit 41 can be coupled with the light tunnel assembly 3 in a state that the incoming hole 51 of the first accommodating unit 41 is aligned with the light tunnel assembly 3. Thus, the first accommodating unit 41 can communicate with the light tunnel assembly 3 through the incoming hole 51.

The first reflection mirror holder 32 can be coupled to the front of the first reflection mirror 31, thereby supporting the circumference of the first reflection mirror 31. Further, the supporting bracket 34 can be coupled to the back of the first reflection mirror 31, thereby supporting the back of the first reflection mirror 31. Then, the first reflection mirror holder 32 coupled to the first reflection mirror 31 can be coupled to the first reflection mirror cover 33 by the first, second and third adjusting members 90, 93, 96 while the supporting bracket 34 is disposed between the first reflection mirror 31 and the first reflection mirror cover 33. That is, the first screw 92 of the first adjusting member 90 can be coupled to the first reflection mirror cover 33 and the first reflection mirror holder 32 through the first fastening hole 81 and the first insertion hole 71 of the first reflection mirror cover 33, respectively, the second screw 95 of the second adjusting member 93 can be coupled to the first reflection mirror cover 33 and the first reflection mirror holder 32 through the second fastening hole 82 and the second insertion hole 72 of the first reflection mirror cover 33, respectively, and the third screw 98 of the third adjusting member 96 can be coupled to the first reflection mirror cover 33 and the first reflection mirror holder 32 through the third fastening hole 83 and the second insertion hole 73 of the first reflection mirror cover 33, respectively. At this time, the first, second and third screws 92, 95, and 98 can be coupled with the first, second and third springs 74, 75, and 76, respectively.

Then, the first reflection mirror assembly 30 can be coupled to the second coupling flange 55, so that the first reflection mirror 31 of the first reflection mirror assembly 30 is exposed through the first through hole 54 within the first accommodating unit 41. At this time, the circumference of the first reflection mirror cover 33 is coupled to the second coupling flange 55 while the sealing member 35 is disposed between the first reflection mirror cover 33 of the first reflection mirror assembly 30 and the second coupling flange 55.

Further, the relay lens 36 can be coupled to the first accommodating unit 41 through the mounting hole 56 formed in an upper portion of the first accommodating unit 41, and then the third coupling flange 57 of the first accommodating unit 41 can be coupled with the fourth coupling flange 62 of the second accommodating unit 42 in a state that the mounting hole 56 of the first accommodating unit 41 communicates with the passing hole 63 of the second accommodating unit 42. Then, the second reflection mirror 38 can be mounted to the second accommodating unit 42 through the second through hole 66, so that the second reflection mirror 38 is exposed through the second through hole 66 of the second accommodating unit 42 within the second accommodating unit 42. Then, the second reflection mirror cover 39 disposed in the back of the second reflection mirror 38 can be coupled with the fifth coupling flange 67, and the prism 4 can be coupled to the sixth coupling flange 69 of the second accommodating unit 42 in correspondence to the outgoing hole 68, thereby completing the assembling process of the optical engine apparatus.

Thus, when the light is emitted from the light source 1, the light can travel via the color wheel assembly and the light tunnel assembly 3. The light passed through the light tunnel assembly 3 can enter the inside of the first accommodating unit 41 via the incoming hole 51 of the optical path transformation assembly 20. The incident light can be reflected from the first reflection mirror 31 exposed in the first accommodating unit 41 and can travel toward the relay lens 36. Then, the light can be transmitted through the relay lens 36 and the passing hole 63 and can enter the inside of the second accommodating unit 42. Then, the incident light can be reflected from the second reflection mirror 38 exposed in the second accommodating unit 42 and can travel toward the prism 4 through the outgoing hole 68 of the first accommodating unit 41. The light reflected from the prism 4 can travel toward the DMD panel 7. Then, the light can be reflected again from the DMD panel 7 toward the prism 4 and can be transmitted through the prism 4, thereby traveling toward the projector 5. Then, the projector 5 can magnify and project the light onto the screen, thereby displaying a picture on the screen.

Meanwhile, during the assembling process, the user checks whether the light passing through the light tunnel assembly 3 is correctly projected to the DMD panel 7. In a case where the light passing through the light tunnel assembly 3 is not correctly projected to the DMD panel 7, the user can grab and rotate the first, second or third knob 91, 94, or 97 of the first, second or third adjusting member 90, 93, or 96 in the fastening or releasing direction, so that the inclined angle of the first reflection mirror 31 is adjusted, thereby adjusting the position of the light projected on the DMD panel 7. Substantially, the user can adjust the projecting position of the light while looking at the screen.

As described above, supposing that the user looks at the front of the screen, the light can move up and down on the screen when the user grabs and rotates the first knob 91 of the first adjusting member 90 in the fastening and releasing directions, in the diagonal direction on the screen when the user grabs and rotates the second knob 94 of the second adjusting member 93 in the fastening and releasing directions, and right and left on the screen when the user grabs and rotates the third knob 97 of the third adjusting member 96 in the fastening and releasing directions.

Thus, the light passing through the light tunnel assembly 3 can be easily and quickly adjusted to be correctly projected to the DMD panel 7 by handling the first, second and third adjusting members 90, 93, 96, thereby enhancing a work efficiency.

As described above, the present general inventive concept can provide an optical engine apparatus, in which light passing through a light tunnel assembly is easily and quickly adjusted to be correctly projected to a display device.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. An optical engine apparatus to magnify and project an image beam formed by a display device on a screen, the optical engine apparatus comprising:
   a light source to emit light; and
   a reflection mirror assembly including a reflection mirror to reflect the light emitted from the light source toward the display device, a reflection mirror cover to support a first side of the reflection mirror, and a reflection mirror holder to support a second side of the reflection mirror; and
   an adjuster coupled to the reflection mirror assembly to adjust an inclined angle of the reflection mirror to move the light reflected from the reflection mirror toward the display device in a desired direction.

2. The optical engine apparatus of claim 1, wherein the adjuster adjusts the inclined angle of the reflection mirror to move the light projected from the display device onto the screen in at least one of up and down directions, a diagonal direction, and right and left directions.

3. The optical engine apparatus of claim 2, wherein the adjuster comprises:
   a first adjuster to adjust the inclined angle of the reflection mirror to move the light projected from the display device onto the screen in the up and down directions;
   a second adjuster to adjust the inclined angle of the reflection mirror to move the light projected from the display device onto the screen in the diagonal direction; and
   a third adjuster to adjust the inclined angle of the reflection mirror to move the light projected from the display device onto the screen in the right and left directions.

4. The optical engine apparatus of claim 3, further comprising:
   a light tunnel provided on an optical path between the light source and the reflection mirror to uniformize the light traveling from the light source toward the reflection mirror,
   wherein the adjuster adjusts the inclined angle of the reflection mirror that reflects the light traveling via the light tunnel toward the display device to control the uniformized light to correspond to the display device.

5. The optical engine apparatus of claim 4, further comprising:
a relay lens provided on the optical path between the light tunnel and the display device to focus the light from the light tunnel,
wherein the reflection mirror comprises a first reflection mirror to reflect the light traveling via the light tunnel toward the relay lens, and a second reflection mirror to reflect the light passing through the relay lens toward the display device, and the adjuster is coupled to at least one of the first reflection mirror and the second reflection mirror.

6. The optical engine apparatus of claim 5, wherein the adjuster comprises a first reflection mirror cover and a first reflection mirror holder, and the first reflection mirror comprises a first side supported by the first reflection mirror holder at circumference thereof, and a second side covered with the first reflection mirror cover.

7. The optical engine apparatus of claim 6, wherein the adjuster comprises an insertion hole formed in the first reflection mirror cover, a fastening hole formed in the first reflection mirror holder, and an adjusting member coupled to the first reflection mirror cover and the first reflection mirror holder through the fastening hole and the insertion hole, respectively, to adjust the inclined angle of the first reflection mirror.

8. The optical engine apparatus of claim 7, wherein the insertion hole and the fastening hole are formed with female threads therein, and
the adjusting member comprises a screw portion to mate with the female threads, and a knob to rotate the screw portion in fastening and releasing directions.

9. The optical engine apparatus of claim 8, wherein the adjuster comprises a spring disposed between the first reflection mirror cover and the first reflection mirror holder, and the adjusting member is coupled with the spring to minimize loosening while being rotated in the fastening and releasing directions.

10. The optical engine apparatus according to claim 9, further comprising:
a sealing member coupled to a circumference of the first reflection mirror cover to protect the reflection mirror accommodated in the first reflection mirror cover from foreign materials.

11. The optical engine apparatus of claim 6, further comprising:
a sealing member coupled to a circumference of the first reflection mirror cover to protect the reflection mirror accommodated in the first reflection mirror cover from foreign materials.

12. The optical engine apparatus of claim 1, further comprising a light tunnel provided in an optical path between the light source and the reflection mirror to uniformize the light traveling from the light source toward the reflection mirror,
wherein the adjuster adjusts the inclined angle of the reflection mirror that reflects the light traveling via the light tunnel toward the display device to control the uniformized light to correspond to the display device.

13. The optical engine apparatus of claim 12, further comprising:
a relay lens provided on the optical path between the light tunnel and the display device to focus the light from the light tunnel,
wherein the reflection mirror comprises a first reflection mirror to reflect the light traveling via the light tunnel toward the relay lens, and a second reflection mirror to reflect the light passed through the relay lens toward the display device, and
the adjuster is coupled to at least one of the first reflection mirror and the second reflection mirror.

14. The optical engine apparatus of claim 13, wherein the adjuster comprises a first reflection mirror cover and a first reflection mirror holder, and the first reflection mirror comprises a first side supported by the first reflection mirror holder at circumference thereof, and a second side covered with the first reflection mirror cover.

15. The optical engine apparatus of claim 14, wherein the adjuster comprises an insertion hole formed in the first reflection mirror cover, a fastening hole formed in the first reflection mirror holder, and an adjusting member coupled to the first reflection mirror cover and the first reflection mirror holder through the fastening hole and the insertion hole, respectively, to adjust the inclined angle of the first reflection mirror.

16. The optical engine apparatus of claim 15, wherein the insertion hole and the fastening hole are formed with female threads therein, and
the adjusting member comprises a screw portion mating with the female threads, and a knob to rotate the screw portion in fastening and releasing directions.

17. The optical engine apparatus of claim 16, wherein the adjuster comprises a spring disposed between the first reflection mirror cover and the first reflection mirror holder, and the adjusting member is coupled with the spring to minimize loosening while being rotated in the fastening and releasing directions.

18. The optical engine apparatus of claim 17, further comprising:
a sealing member coupled to a circumference of the first reflection mirror cover to protect the reflection mirror accommodated in the first reflection mirror cover from foreign materials.

19. The optical engine apparatus of claim 14, further comprising:
a sealing member coupled to a circumference of the first reflection mirror cover to protect the reflection mirror accommodated in the first reflection mirror cover from foreign materials.

20. An optical engine apparatus comprising:
a light source to emit light;
a display device to form an image beam using the light;
a projector to project the image beam on a screen;
an optical path transformation assembly having a reflection mirror, a reflection mirror cover to support a first side of the reflection mirror, and a reflection holder to support a second side of the reflection mirror, whereby the reflection mirror controls the light to be transmitted toward the display device along an optical path; and
an adjuster coupled to the optical path transformation assembly to control the reflection mirror to move with respect to at least one of the display device, the light source, and the screen.

21. The optical engine apparatus of claim 20, wherein the adjuster controls the reflection mirror to transmit the light toward the projector along a second optical path other than the optical path.

22. The optical engine apparatus of claim 20, wherein the adjuster adjusts a position of the reflection mirror to change a path of the light from the optical path to a second path in one of first, second, and third directions.

23. The optical engine apparatus of claim 22, wherein the first, second, and third directions are up and down directions, a diagonal directions, and right and left directions with respect to the at least one of the display device, the projector, and the screen.

24. The optical engine apparatus of claim 22, wherein the adjuster comprises three adjusting members to control the reflection mirror to reflect the light in the first, second, and third directions, respectively.

25. The optical engine apparatus of claim 20, wherein the adjuster is coupled to an outer circumference of the optical path transformation assembly so that a user controls the adjuster while watching the projected image beam on the screen.

26. The optical engine apparatus of claim 20, wherein the adjuster comprises at least one adjusting member to protrude from an outer circumference of the optical path transformation assembly.

27. The optical engine apparatus of claim 26, wherein the projector protrudes from a second outer circumference of the optical path transformation assembly so that a user adjusts the at least one adjusting member while watching a position of the image beam with respect to the screen.

28. The optical engine apparatus of claim 20, further comprising:
a base;
a plurality of sides extended upward from the base.

29. The optical engine apparatus of claim 20, wherein the optical path transformation assembly comprises a relay lens to focus the light reflected from the reflection mirror, a second reflection mirror to reflect the focused light, and a prism to selectively transmit and reflect the light from the second reflection mirror to the display device and the image beam from the display device to the projector.

30. The optical engine apparatus of claim 20, further comprising:
a partition disposed between the light source and the optical path transformation assembly; and
a light tunnel assembly disposed on the partition to control the light to form a surface to correspond to a surface of the display device.

31. An optical path transformation assembly to adjust a position of light projected on a display device comprising:
a reflection mirror to reflect the light emitted from a light source toward the display device;
a reflection mirror holder to support a first side of the reflection mirror at a circumference thereof;
a reflection mirror cover to support a second side of the reflection mirror at a circumference thereof;
a first adjuster coupled to the reflection mirror cover and the reflection mirror holder to adjust the inclined angle of the reflection mirror to move the light projected from the display device onto the screen in the up and down directions;
a second adjuster coupled to the reflection mirror cover and the reflection mirror holder to adjust the inclined angle of the reflection mirror to move the light projected from the display device onto the screen in the diagonal direction; and
a third adjuster coupled to the reflection mirror cover and the reflection mirror holder to adjust the inclined angle of the reflection mirror to move the light projected from the display device onto the screen in the right and left directions.

* * * * *